United States Patent [19]

Matsushita et al.

[11] Patent Number: 4,841,212
[45] Date of Patent: Jun. 20, 1989

[54] ELECTROMAGNETIC BEARING CONTROL APPARATUS

[75] Inventors: Osami Matsushita, Taira; Michiyuki Takagi, Ushiku; Mitsuho Yoneyama, Tiyoda; Toyomi Sugaya, Shimoinayoshi; Ikuhiro Saito, Simoinayoshi, all of Japan

[73] Assignee: Hitachi, Ltd., Tokyo, Japan

[21] Appl. No.: 102,561

[22] PCT Filed: May 28, 1987

[86] PCT No.: PCT/JP87/00342
§ 371 Date: Aug. 12, 1987
§ 102(e) Date: Aug. 12, 1987

[87] PCT Pub. No.: WO88/02073
PCT Pub. Date: Mar. 24, 1988

[30] Foreign Application Priority Data

Sep. 12, 1986 [JP] Japan ................. 61-213903

[51] Int. Cl.⁴ .................................... G05B 1/01
[52] U.S. Cl. .......................... 318/607; 318/632; 310/90.5
[58] Field of Search ............. 310/90.5; 318/640, 629, 318/632, 687, 607, 460

[56] References Cited

U.S. PATENT DOCUMENTS

| | | | |
|---|---|---|---|
| 1,589,039 | 6/1926 | Anschutz | 310/90.5 |
| 2,602,660 | 7/1952 | Shannon | 310/90.5 |
| 3,243,238 | 3/1966 | Lyman | 310/90.5 |
| 3,508,445 | 4/1970 | Penney, Jr. et al. | 310/90.5 X |
| 3,638,093 | 1/1972 | Ross | 318/687 |
| 3,988,658 | 10/1976 | Meinke et al. | 318/647 |
| 4,121,143 | 10/1978 | Habermann et al. | 318/629 |
| 4,583,031 | 4/1986 | Brunet et al. | 310/90.5 X |
| 4,626,754 | 12/1986 | Habermann et al. | 318/460 |
| 4,686,404 | 8/1987 | Nakazeki et al. | 318/629 X |
| 4,697,128 | 9/1987 | Matsushita et al. | 318/607 |

*Primary Examiner*—Benjamin Dobeck
*Attorney, Agent, or Firm*—Antonelli, Terry & Wands

[57] ABSTRACT

In an electromagnetic bearing control apparatus for suppressing vibratory rotational motion of a rotor, a selective extraction unit is provided in servo-circuits which control currents being supplied to electromagnetic coils in accordance with x and y-component signals of radial displacement of the rotor such that the rotor is held in a predetermined radial position, and x and y-component signals delivered out of the selective extraction unit are crossed and inputted to the servo-circuits so as to be added in opposite polarities to processed x and y-component signals of radial displacement.

7 Claims, 6 Drawing Sheets

ELECTROMAGNETIC BEARING CONTROL APPARATUS

TECHNICAL FIELD

This invention relates to a control apparatus for a magnetic floating type rotor supported by an electromagnetic bearing and more particularly to an electromagnetic bearing control apparatus suitable for suppressing to a minimum the vibration amplitude of whirling motion of the rotor.

BACKGROUND ART

A rotor of rotary machine supported by an electromagnetic bearing using attraction type electromagnets as a bearing is typically controlled as will be described below. Electromagnetic coils are arranged along one axis on the right and left sides of the rotor and when the rotor is displaced to the right, a control current flows into one electromagnetic coil on the left side to exert attractive force so that the rotor is forcibly deflected to the left. Conversely, when the rotor is displaced to the left, a control current flows into the other electromagnetic coil on the right side to exert attractive force. In this way, the rotor is servo-controlled such that responsive to displacement of the rotor to the right or left, the control current is passed to the electromagnetic coil on the side opposite to the displacement and attractive force generated by that electromagnetic coil brings the rotor into the center position.

U.S. Pat. No. 4,128,795 discloses a prior art electromagnetic bearing control apparatus of this type, which is schematically illustrated in FIG. 14 of this application.

In this known apparatus, detected x and y-component signals of displacement (hereinafter simply referred to as displacement signals x and y) are differentiated to produce x and y-component signals of velocity (hereinafter simply referred to as velocity signals $\dot{x}$ and $\dot{y}$) and the velocity signals $\dot{x}$ and $\dot{y}$ are added to the displacement signals x and y at blocks 11 and 12, providing $ax+b\dot{x}$ and $ay+b\dot{y}$. The displacement signals added with the velocity signals are passed through a rotation synchronous tracking filter 7 (triggered by a pulse signal) to extract only rotation synchronous components of the displacement signals and velocity signals, $x_o=ax_N+b\dot{x}_N$ and $y_o=ay_N+b\dot{y}_N$, which are respectively added with the displacement signals x and y processed by being passed through control circuits 6 and 8, respectively. The sum signals are supplied to electromagnetic coils 2 and 3 through associated amplifiers 9 and 10 in order to control only a rotation synchronous unbalanced vibration. Thus, the bearing stiffness can be adjusted by changing the magnitude of the displacement signals and the bearing damping can be adjusted by changing the magnitude of the velocity signals.

Disadvantageously, the prior art control apparatus requires that the velocity signals be produced from the displacement signals by means of the differentiation circuits, thus complicating the circuit design of the apparatus. Further the addition of the rotational synchronous components of displacement and velocity extracted from the displacement signals x and y and velocity signals $\dot{x}$ and $\dot{y}$ by means of the rotation synchronous tracking filter to the displacement signals x and y prevents the rotation synchronous unbalanced vibration from being sufficiently suppressed, due to not to make enough differential signal increase.

DISCLOSURE OF INVENTION

An object of this invention is to provide an electromagnetic bearing control apparatus capable of reducing the resonance amplitude of rotation synchronous unbalanced vibration.

According to this invention, to accomplish the above object, a selective extraction unit, for example, a rotation speed or number tracking filter for extracting rotor rotation synchronous component signals is provided in servo-circuits which control currents in X and Y directions being supplied to electromagnetic coils in accordance with x and y-component signals of radial displacement of the rotor (displacement signals x and y) such that the rotor is held in a predetermined radial position, and rotation synchronous x and y-component signals delivered out of the selective extraction unit and crossed and added to the servo-circuits so as to add the processed x-component signal to the y-component signal on the y-servo-circuit and vice versa.

The expression "crossed and inputted to the servo-circuits so as to be added in opposite polarities" means that the rotation synchronous x-component signal is inputted to one servo-circuit for the displacement signal y so as to be added to the processed displacement signal y, and the rotation synchronous y-component signal is inputted to the other servo-circuit for the displacement signal x so as to be subtracted from the processed displacement signal x or alternatively that the rotation synchronous x-component signal is inputted to the other servo-circuit for the displacement signal y so as to be subtracted from the processed displacement signal y and the rotation synchronous y-component signals is inputted to one servo-circuit for the displacement signal x so as to be added to the processed displacement signal x.

With the above construction, frequency component signals to be controlled are extracted from the detected displacement signals x and y and crossed for coupling with the processed displacement signals y and x to ensure that differentiation signals, i.e., vibration suppressive signals can be obtained without using differentiation circuits. The vibration attendant on the rotation of the rotor is of orbital motion which depends on the rotation number of the motor to take the form of an unstable vibration in a direction of orbital motion which coincides with the direction of the rotation of the rotor about its own axis, that is in a direction of "forward" orbital motion and to take the form of an unstable vibration in a direction of orbital motion which does not coincide with the direction of the rotation of the rotor about its own axis, that is, in a direction of "backward" orbital motion. Addition or subtraction for the crossed signals is selected by means of a switching unit to prevent either of the forward and backward unstable vibrations.

BEST MODE FOR CARRYING OUT THE INVENTION

Figure 1:
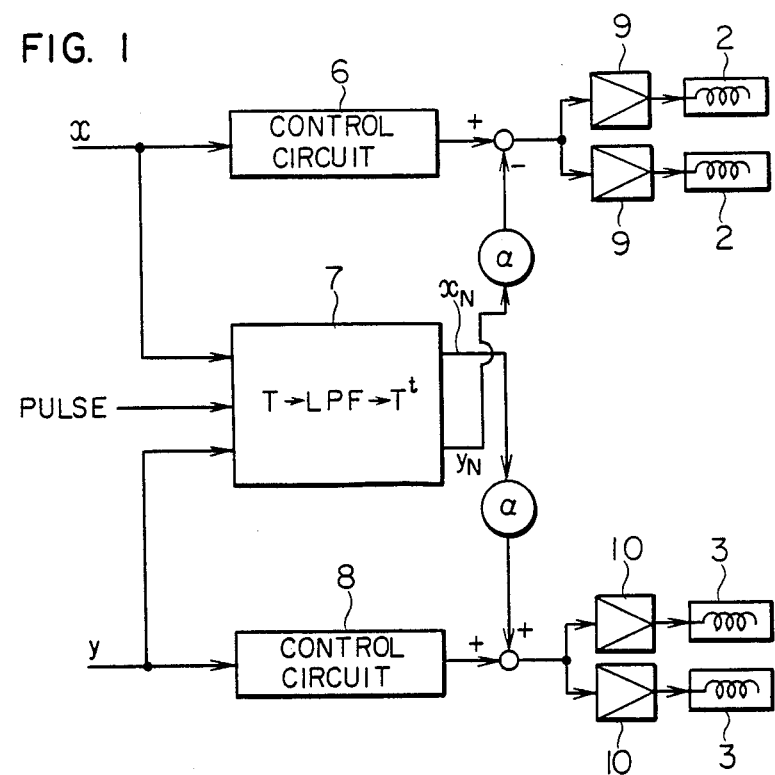
FIG. 1 is a block diagram illustrating a servo-control system according to an embodiment of the invention.

A first embodiment of the invention will now be described with reference to FIGS. 1 and 2. An x-component signal of displacement (displacement signal x) detected by a displacement sensor 4 is supplied to a control circuit 6 which responds to the displacement signal x to determine a control current in accordance with the right or left displacement of a rotor 1 from the center position. The control current is amplified at right-side and left-side power amplifiers 9 to produce control currents $i_x$ which flow into coils 2. The direction of the input control currents to the right-side and left-side power amplifiers 9 is set so that attractive force generated by each electromagnet exerts a centripetal effect upon the rotor 1. Similarly, a displacement signal y detected by a displacement sensor 5 is supplied to a control circuit 8 and control currents $i_y$ delivered out of power amplifier 10 are passed through coils 3. The displacement signals x and y are also supplied to a rotation synchronous component tracking filter 7 which extracts from the displacement signals x and y only rotation synchronous component signals $x_N$ and $y_N$. The rotation synchronous components signals $x_N$ and $y_N$ are crossed and added in opposite polarities to respective the main servo-channels.

Figure 3:
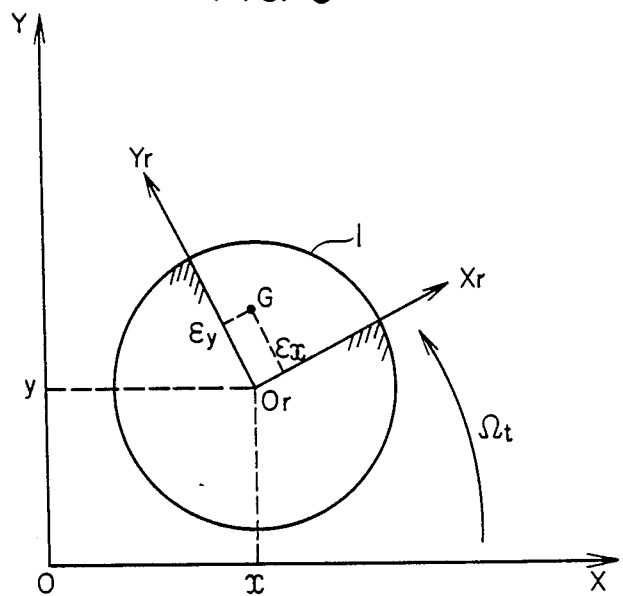
FIG. 3 is a diagram of a dynamic model useful in explaining rotor displacement and unbalancing.

The vibratory rotational motion will be described specifically. FIG. 3 is conveniently used to explain an unbalanced vibration. It is assumed that the motion axis $O_r$ of the rotor 1 is displaced to take coordinates x and y as viewed from a spatially fixed coordinate system O-XY, that the rotor 1 has the center of gravity G located at coordinates $\epsilon_x$ and $\epsilon_y$ as viewed from a rotating coordinate system $O_r\text{-}X_rY_r$ which is fixed on the rotor 1, and that the rotor 1 has a rotation speed $\Omega$. Then, the axis OX and the axis $O_rX_r$ subtend an angle of $\Omega t$ in terms of the rotary angle at arbitrary time t.

Because of unbalancing, x and y-components of force F exerting on the rotor 1 are, $$x \text{ component } F_x = m\epsilon_x\Omega^2 \cos \Omega t \quad \bigg\} \quad (1)$$
$$y \text{ component } F_y = m\epsilon_y\Omega^2 \sin \Omega t$$

where m is the mass of rotor. The force F can be indicated on the complex plane as $F = F_x + iF_y$ which is, $$\begin{aligned} F &= F_x + iF_y \\ &= m\epsilon\Omega^2 e^{i\Omega t} \end{aligned} \quad (2)$$

where i is the imaginary unit and $\epsilon = \epsilon_x + i\epsilon_y$. Therefore, the force F is forward force which rotates in the same direction as that of the rotor rotation.

Figure 4:
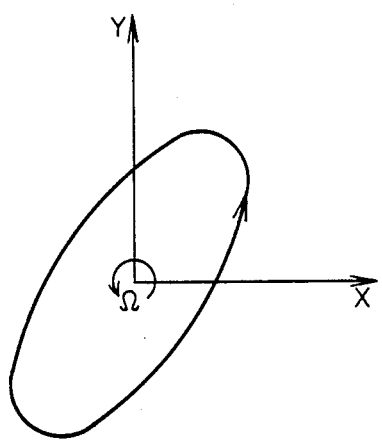
FIG. 4 is a diagram illustrating an orbit of the center of a vibratory rotational rotor, supported by asymmetric bearing and subject to an unbalance vibration.

A vibration of the rotor 1, on the other hand, can be detected in terms of x and y-components x and y. The vibration frequency coincides with the rotation speed $\Omega$ and the x and y-components x and y of the vibration are expressed as, $$x = a_x \cos (\Omega t - \theta_x) \quad \bigg\} \quad (3)$$
$$y = a_y \cos (\Omega t - \theta_y)$$

where $a_x$ and $a_y$ represent the amplitude of the x and y-components x and y, and $\theta_x$ and $\theta_y$ represent the phase delay as viewed from the rotation angle. Thus, vibration can likewise indicated on the complex plane, demonstrating that the motion axis traces an elliptical orbit as shown in FIG. 4. Since $\theta_y - \theta_x < 180°$, the direction of the orbit is the same as that of the rotation speed $\Omega$ and is therefore forward as indicated by arrow.

If the bearing support stiffness by the electromagnet under the control of the x-component servo-control circuit equals that by the electromagnet under the control of the y-component servo-control circuit, that is, when x and y-components of bearing stiffness are set homogeneously, the x and y-components x and y of vibration have the same amplitude. The phase difference between the x and y-components x and y is 90° with the x-component x 90° leading relative to the y-component y. This is indicated by, $$a_x = a_y \quad \bigg\} \quad (4)$$
$$\theta_y = \theta_x + 90°$$

Figure 5:
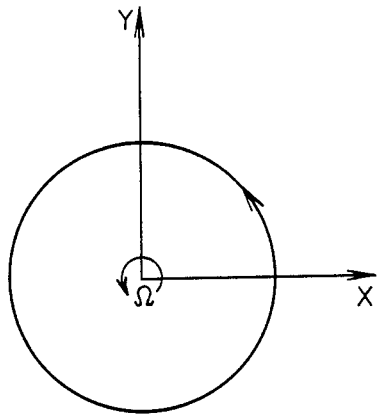
FIG. 5 is a diagram illustrating a vibratory rotational motion trace of the motion axis of a homogeneous rotor subject to an unbalanced vibration.

In this particular case wherein x and y-components $F_x$ and $F_y$ of unbalance force exert on the rotor symmetrically as indicated in equation (2) and the stiffness of the bearing supporting the rotor is symmetrical. The x and y-components x and y of rotor vibration become:

$$x\text{-component } x = a \cos (\Omega t - \theta) \quad \bigg\} \quad (5)$$
$$x\text{-component } y = a \sin (\Omega t - \theta)$$

where a substitutes for $a_x = a_y$ and $\theta$ substituted for $\theta_x$. Thus, the vibration can likewise indicated on the complex plane, demonstrating that the center of the rotor motion traces a circular orbit as shown in FIG. 5. The direction of the orbit is the same as that of the rotation speed $\Omega$ and is therefore forward.

As described above, the rotor vibration traces a circular orbit when the bearing stiffness is homogeneous but traces an elliptical orbit for the inhomogeneous bearing stiffness. The direction of the orbit coincides with that of the rotor rotation and is therefore forward. Accordingly, when describing the displacement in complex expression which is, $$Z = x + iy \tag{6}$$

the displacement takes formulas as below depending upon whether the bearing stiffness is homogeneous or inhomogeneous.

For a homogeneous bearing, $$Z = ae^{i\Omega t} \tag{7}$$

and for an inhomogeneous bearing, $$Z = a_f e^{i\Omega t} + a_b e^{-i\Omega t} \tag{8}$$

where $a$, $a_f$ and $a_b$ are complex numbers indicative of complex amplitude, and $|a_f| > |a_b|$. Generally, the electromagnetic bearing support tends to be inhomogeneous for low-speed rotation but approaches to homogeneity as the rotation speed increases.

The x and y-components of the above-described displacement due to the unbalanced vibration are detected by the displacement sensors 4 and 5. The detected displacement signals x and y are supplied to the rotation synchronous tracking filter 7 which extracts only the rotation synchronous component signals $x_N$ and $y_N$ from the displacement vibration components of the rotor. When the bearing reaction forces is symmetrical, the rotation synchronous unbalance vibration $Z_N = x_N + iy_N$ is prescribed by equation (7) and becomes $$Z_N = ae^{i\Omega t} \tag{9}$$

where $$x_N = a_N \cos(\Omega t - \theta_N)$$
$$y_N = a_N \sin(\Omega t - \theta_N) \tag{10}$$

and $a = a_N e^{-i\theta_N}$

Now, it is of significance to appreciate that $$\left. \begin{array}{l} \dot{x}_N = -\Omega y_N \\ \dot{y}_N = +\Omega x_N \end{array} \right\} \tag{11}$$

stands. When the unbalance vibration traces a circular orbit proceeding from x-axis to y-axis in the same direction as that of the rotor rotation as shown in FIG. 5, a signal which precedes an x-direction vibration by 90° is corresponded by y-direction vibration and a signal which precedes a y-direction vibration by 90° is predicted by a x-direction vibration. This prediction means a differentiation operation which physically agrees with the above equation (11).

When considering only the rotation synchronous vibration components, equation (11) is valid and the output signal $x_N$ of the tracking filter 7 may conveniently be taken for the differentiation signal $\dot{y}_N$ and the output signal $y_N$ may conveniently be taken for the differentiation signal $-\dot{x}_N$. Therefore, in order to obtain y-component damping, the signal $x_N$ is multiplied by $\alpha$ and inputted for addition to the y-component channel. On the other hand, in order to obtain x-component damping, the signal $y_N$ is multiplied by $-\alpha$ and inputted for addition to the x-component channel. Thus, in FIG. 1, the signal $y_N$ is multiplied by $\alpha$ and inputted for subtraction to the x-component channel.

For rotation synchronous vibration components, the signals $x_N$ and $y_N$ are crossed and inputted for addition and subtraction to the o-posite channels in this manner to provide reactive force as indicated by, $$F_x = -\alpha y_N \equiv k_{xy} y \tag{12}$$

$$F_y = +\alpha x_N \equiv +k_{yx} x \tag{13}$$

For $k_{xy} < 0$, $k_{yx} > 0$ is set. Thus, damping against the formed vibration of the rotor can be purposely improved.

Although better results may be obtained with larger coefficient for the channel-crossing addition and subtraction inputting, the value of the coefficient is limited from the standpoint of preventing saturation of electronic circuits and gain for $\alpha$ may be adjusted so that suitable resonance amplitude can be obtained.

Next, the principle of the tracking filter 7 will be described with reference to FIG. 6. When the rotor rotates near a resonance point in the bending moment mode, the rotor vibration is caused partly but principally because of the forward rotation synchronous vibration components and partly because of a fluctuation of the rotor due to external force attributable to, for example, shaking of the casing. The fluctuation has a vibration frequency which approximates a natural vibration frequency in the rigid body mode and which is therefore lower than the rotation number of the rotor. Accordingly, the tracking filter 7 is supplied with an input rotor vibration $Z_{in}$ the complex expression of which is so governed by equation (7) as to be indicated as, $$Z_{in} = (\text{fluctuation}) + ae^{i\Omega t} \tag{14}$$

and it delivers only a rotation synchronous component $Z_{out}$ (complex form) which is, $$Z_{out} = ae^{i\Omega t} \tag{15}$$

Figure 6:
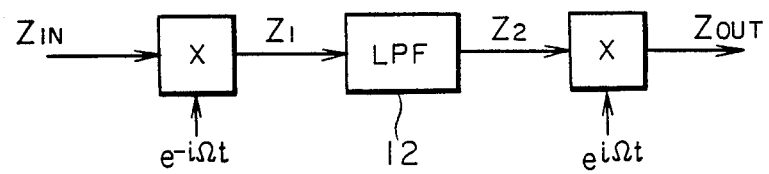
FIG. 6 is a block diagram for explaining the principle of a rotation synchronous filter.

In principle, the tracking filter is then constructed as shown in block form in FIG. 6.

Referring to FIG. 6, the input signal $Z_{in}$ is first multiplied by $e^{-i\Omega t}$ so as to be converted into a signal $Z_1$ as viewed from the rotating coordinate system. This is indicated by, $$Z_1 = e^{-i\Omega t} Z_{in} \equiv (\text{fluctuation}) \times e^{i\Omega t} + a \tag{16}$$

Equation (16) shows that the rotation synchronous component $ae^{i\Omega t}$ in equation (14) is converted into a DC component $a$ in the signal $Z_1$ as viewed from the rotating coordinate system. It is also noted that the first term of low frequency in the fixed coordinate system for $Z_{in}$ changes to the first term of high frequency in the rotating coordinate system for $Z_1$.

To extract the rotation synchronous DC component $a$, the signal $Z_1$ is passed through a low-pass filter 12. The low-pass filter 12 produces an output signal $Z_2$ which is, $$Z_2 \approx a \tag{17}$$

The cut-off frequency of the low-pass filter 12 is smaller than the rotation number and is typically set to several Hz or less, amounting to about 0.1 Hz. The gain of this low-pass filter 12 is 1 (one).

Subsequently, the signal $Z_2$ on the rotating coordinate system is multiplied by $e^{i\Omega t}$ so as to be inversely converted into a signal on the fixed coordinate system. As a result, only the rotation synchronous component can be extracted from the input signal $Z_{in}$ to provide the output signal $Z_{out}$ of equation (15).

Figure 7:
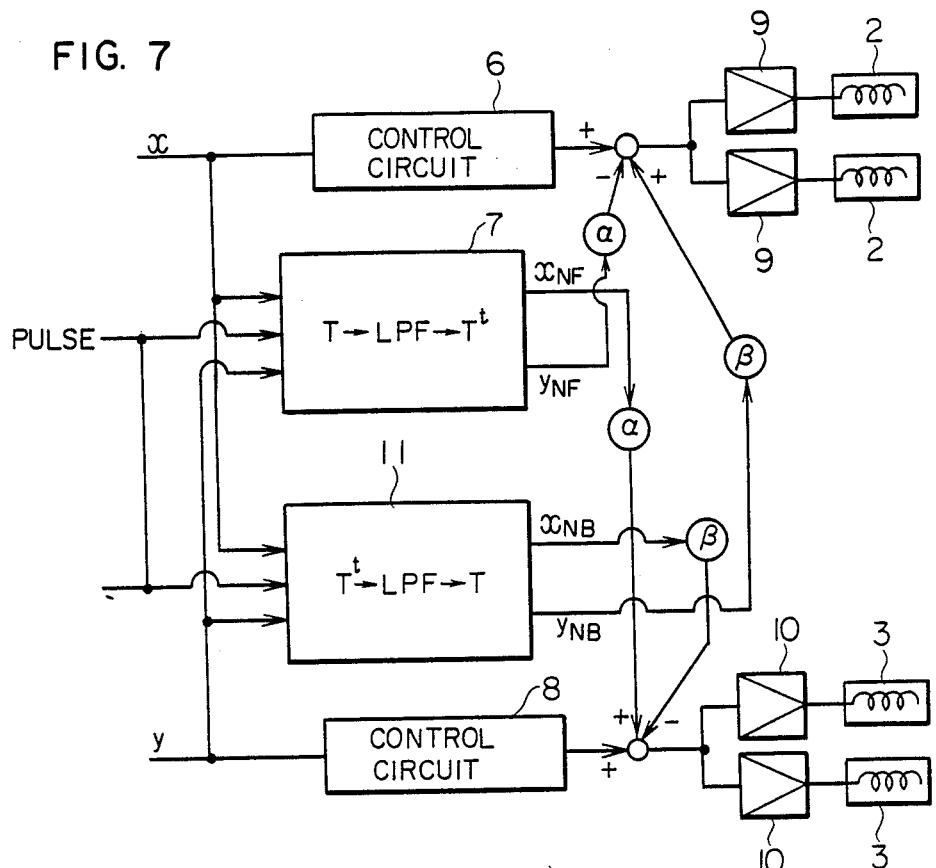
FIG. 7 is a block diagram illustrating a servo-control system according to a second embodiment of the invention.

FIG. 7 illustrates a second embodiment of the invention. A circuit arrangement shown in FIG. 7 is for suppressing the unbalanced vibration of equation (8) for inhomogeneous bearing stiffness tracing the elliptical orbit of FIG. 4.

Figure 2:
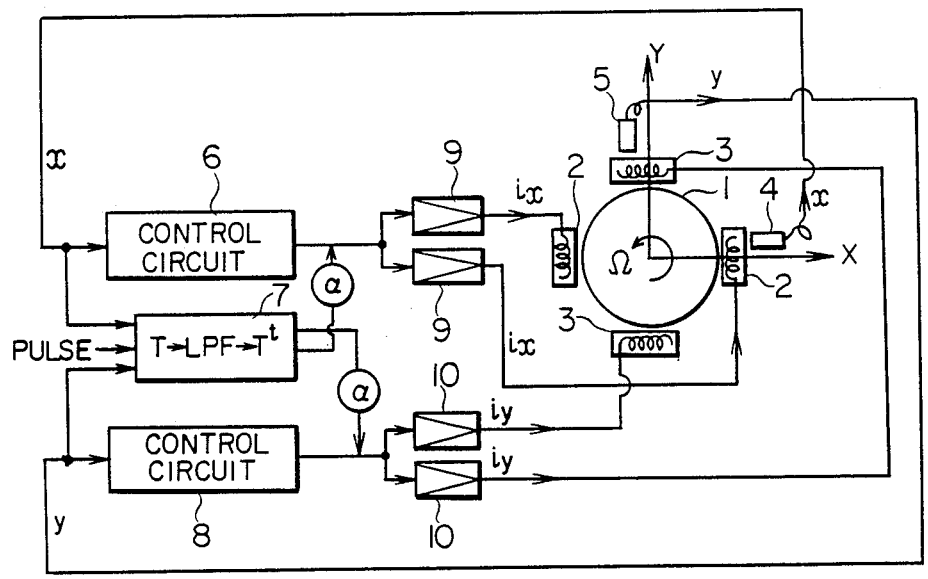
FIG. 2 schematically shows a servo-circuit based on the FIG. 1 system for a rotor supported by an electromagnetic bearing.

In this embodiment, the forward vibration term $a_f e^{i\Omega t}$ in equation (8) can be suppressed in the same manner as in the previous embodiment of FIG. 1. For the sake of suppressing the backward vibration term $a_b e^{-i\Omega t}$, the processing for the forward vibration may be reversed. More particularly, a rotation synchronous tracking filter 11 for the backward rotation is additionally provided and rotation synchronous components $x_{NB}$ and $y_{NB}$ (forward rotation synchronous components are designated by $x_{NF}$ and $y_{NF}$ in FIG. 7) are subjected to channel-crossing addition and subtraction inputting by using coefficient $\beta$ which is opposite in polarity to $\alpha$. By using this type of the tracking filter, it's possible to surpress the unbalance vibration of the rotor supported by asymmetrical bearing.

Figure 8:
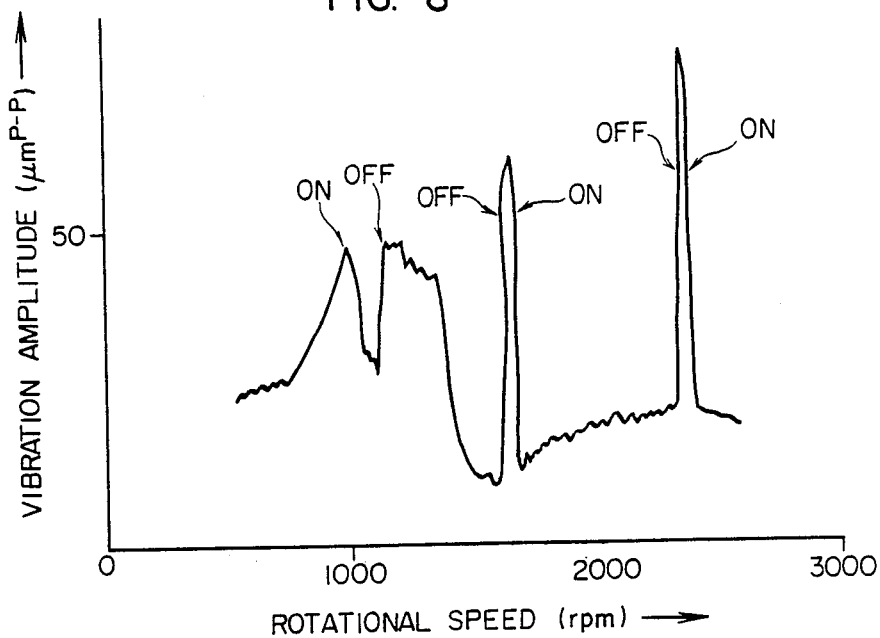
FIG. 8 is a graph illustrating unbalanced vibration responses.

By using the rotation synchronous tracking filter and the channel-crossing in accordance with the invention, experimental data as graphically illustrated in FIG. 8 can be obtained, where abscissa represents the rotation number and ordinate the vibration amplitude. The curve is on excursion designated by "ON" when the FIG. 1 system of this invention is operated and on excursion designated by "OFF" when the channel-crossing is disconnected with $\alpha$ rendered zero. It will be seen that the vibration amplitude is abruptly decreased at "ON" and it recovers a large level at "OFF".

As will be seen from the foregoing description, the unbalanced vibration can be suppressed actively through fundamental steps as below. In the first place, x and y-components of a rotor vibration (displacement signals x and y) are detected and supplied to the tracking filter which extracts rotation synchronous component signals $x_N$ and $y_N$ from the displacement signals x and y and in the second place, the extracted signals $x_N$ and $y_N$ are crossed and respectively inputted to the y-component channel so as to be added to the processed displacement signal y and to the x-component channel so as to be added to the processed displacement signal x. Polarities of addition of the signals $x_N$ and $y_N$ are opposite to each other, one representing addition and the other representing subtraction.

To sum up, this invention features that frequency component signals to be controlled are extracted from the detected displacement signals x and y and crossed for coupling in opposite polarities with the main servo-circuit in x and y direction to ensure that differentiation signals, i.e., vibration suppressive signals can be obtained.

Incidentally, a rotor enclosing liquid undergoes a self-excited vibration with the frequency which is independently of the rotation speed. Such a self-excited vibration can be suppressed as will be described below.

Figure 9:
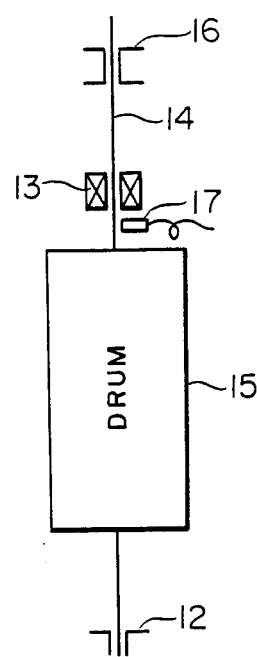
FIG. 9 schematically shows a rotary machine model implementing teachings of the invention.
Figure 10:
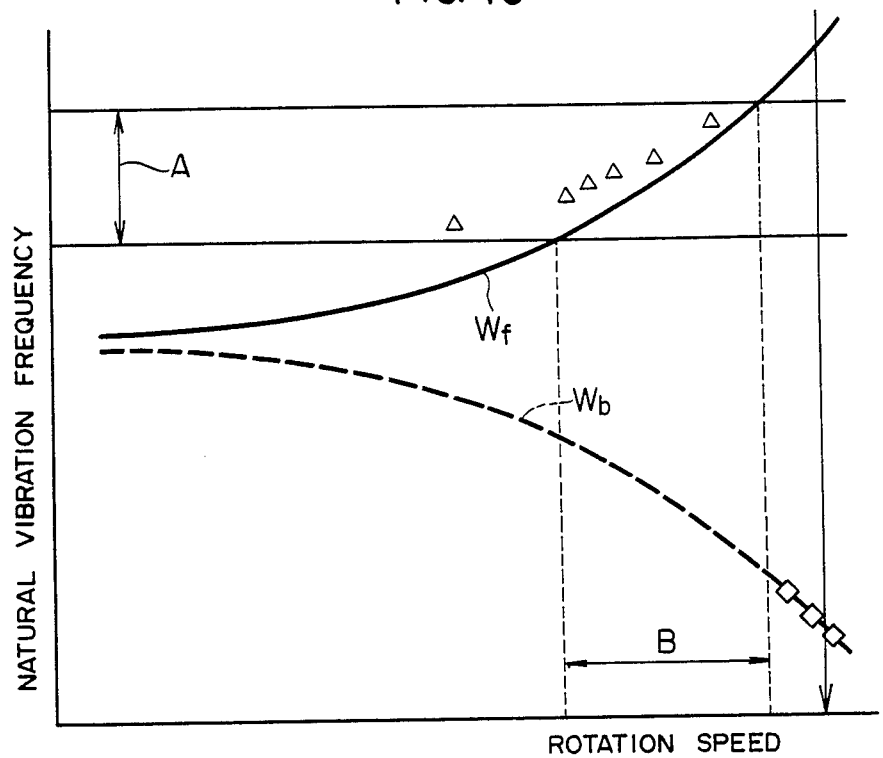
FIG. 10 is a graph showing the relation between rotation number and natural vibration frequency in the FIG. 9 rotary machine.

FIG. 9 shows an instance wherein a rotor undergoes a self-excited vibration due to flow of fluid inside the rotor. Referring to FIG. 9, a rotor comprises a drum 15 connected to a single rotary shaft 14 which is supported by upper and lower ball bearings 16 and 12 of conventional passive type. This rotor constitutes a centrifugal separator in which fluid is charged through an upper portion of the rotary shaft 14 into the drum 15 and discharged through a lower portion of the rotary shaft 14. The axial flow of liquid in the rotor causes a self-excited rotor vibration with frequency shown in a certain frequency domain A as illustrated in FIG. 10. This vibration happens within a certain rotation speed region B. The frequency of the self-excited vibration is plotted as indicated by "Δ" symbol in FIG. 10. To suppress this self-excited vibration, an electromagnetic bearing 13 is provided as shown in FIG. 9. A sensor 17 detects an amount of displacement of the rotary shaft 14 and produces a displacement signal. A control signal based on the displacement signal is passed through the electromagnetic bearing 13 to suppress the self-excited vibration.

Figure 11:
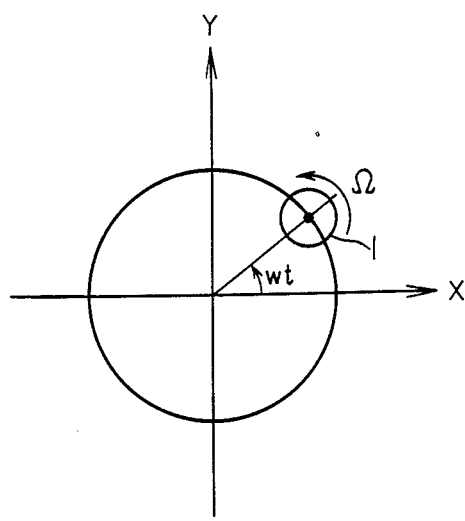
FIG. 11 illustrates a vibratory rotational motion trace of the motion axis of a rotor undergoing a self-excited vibration.

To detail the prevention of the self-excited vibration, the frequency designated at "Δ" of the self-excited vibration is different from the rotation speed and well predictable, in the phase of design as a natural vibration frequency which depends upon the rotor configuration and the support stiffness of ball bearings. Curves $W_f$ and $W_b$ are respectively representative of predictive values of a forward natural vibration frequency and a backward natural vibration frequency. The direction of the self-excited vibration due to fluid flow is forward as illustrated in FIG. 11. Thus, the measured frequency Δ of the self-excited vibration can be predicted by the calculation as forward natural vibration frequency $W_f$ as will be seen from FIG. 10. The self-excited vibration can be prevented by means of a control circuit as shown in FIG. 12 which forms another embodiment of the invention.

Figure 12:
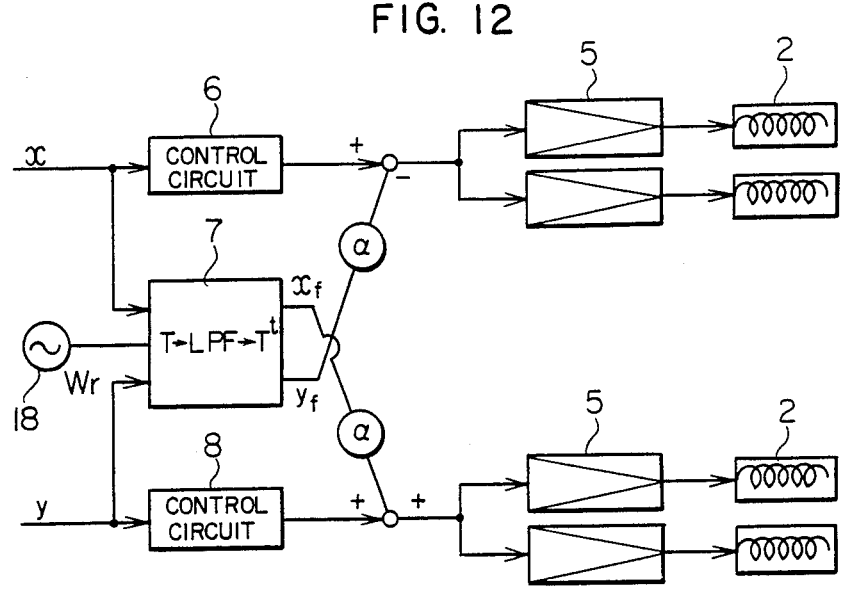
FIG. 12 is a block diagram illustrating a servo-control system according to a third embodiment of the invention.

Referring to FIG. 12, x and y-component control circuits 6 and 8 are identical to those of the previous embodiments. In the FIG. 12 embodiment, to trigger a tracking filter 7, a signal $W_n$ is used in place of the pulse, the signal $W_n$ being generated from an oscillator 18 of the same frequency as a natural vibration frequency of the self-excited vibration. The tracking filter 7 extracts x and y-component signals $x_f$ and $y_f$ of the self-excited vibration from the displacement signals x and y. Particularly, due to the fact that the self-excited vibration is forward, the component signals $x_f$ and $y_f$ are crossed so that the component signal $y_f$ is negatively added to the x-component channel and the component signal $x_f$ is positively added to the y-component channel. Consequently, the electromagnetic bearing 13 can generate vibration preventive damping as in the case of the unbalanced vibration.

Figure 13:
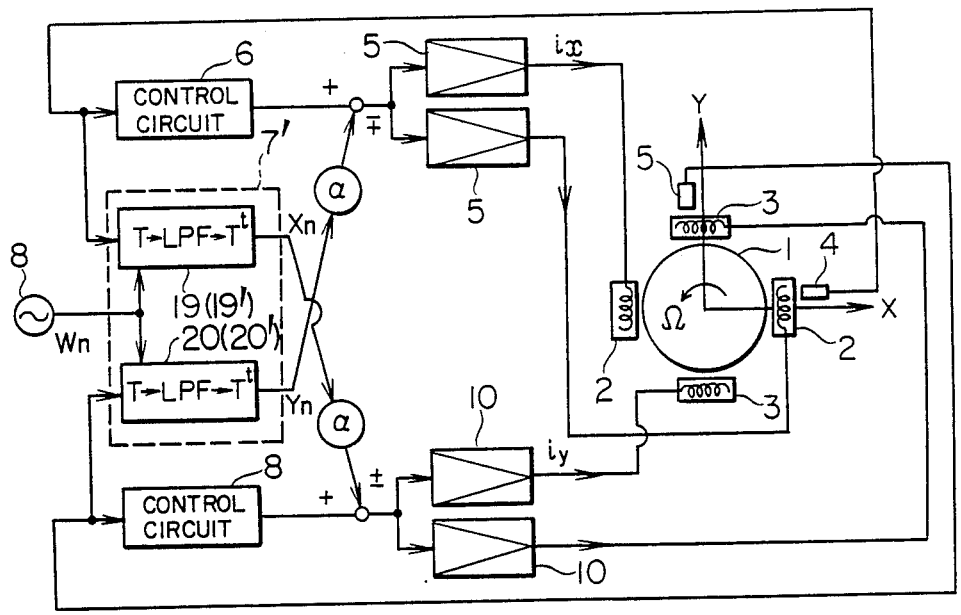
FIG. 13 shows a fourth embodiment of the invention.
Figure 14:
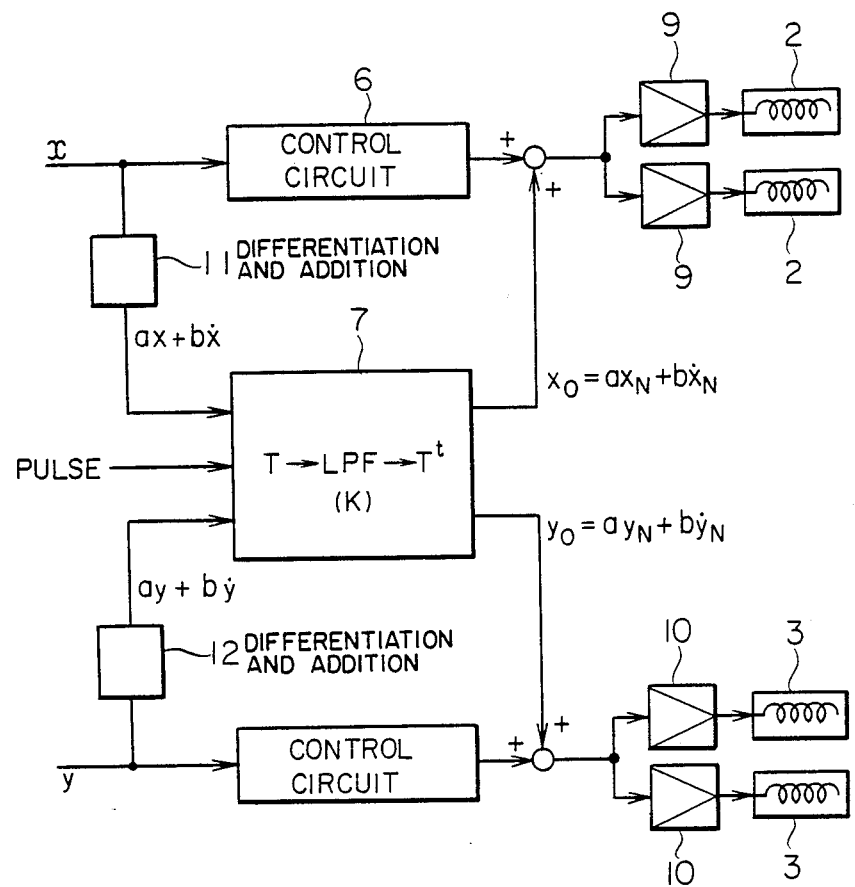
FIG. 14 is a block diagram illustrating a prior art servo-control system.

As shown in FIG. 10, the frequency of the self-excited vibration slightly changes with the rotation speed. However, the self-excited vibration frequency is inherent to the rotor and predictable within a certain extent. Accordingly, band-pass filters 19 and 20 are used in a tracking filter 7' as illustrated in FIG. 13 for extracting desired frequency component signals $x_n$ and $y_n$ from the displacement signals x and y. Again considering that the self-excited vibration is forward, the output signals $x_n$ and $y_n$ from the tracking filter 7' are crossed and inputted to the y and x-component channels so as to be added to the processed displacement signals y and x in opposite polarities.

The self-excited vibration tends to be backward as the rotation speed increases. For instance, the backward self-excited vibration converging to low natural vibration frequencies as indicated by symbol "☐" in FIG. 10. To prevent the backward self-excited vibration, the tracking filter 7' of FIG. 13 is constituted with low-pass filters 19' and 20' and extracts low-frequency component signals $x_n$ and $y_n$ from the displacement signals x and y. The output signals $x_n$ and $y_n$ from the tracking filter 7' are crossed and inputted to the y and x-component channels so as to be added to the processed displacement signals y and x in opposite polarities. The totalling point is set to be positive at the x-component channel and negative at the y-component channel, thereby making it possible to suppress the backward self-excited vibration.

In this manner, the output signals from the filter for extracting vibration frequency signals within a desired frequency region are crossed and inputted to the x and y-component channels so as to be added to the main servo in x and y channel in opposite polarities. The polarity of the totalling point at the x and y-component channels depends on whether the vibration to be controlled is forward or backward.

Since the direction of the vibration changes with the rotation speed of the rotor, a switch provided to precede the filter circuit may be operated in accordance with the rotation number to selectively suppress the forward or backward vibration. It can be seen from FIG. 10 that the self-excited vibration is caused within the specified rotation speed range. Therefore, the arrangement for suppressing the self-excited vibration may be operated only within this range.

As has been described, according to the invention even when the rotor is rotating near the resonance point, the forward unbalanced vibration can be suppressed without resort to any differentiation circuit. Further, the self-excited vibration can also be suppressed.

INDUSTRIAL APPLICABILITY

This invention is applicable to a control apparatus for a magnetic floating type rotor supported by an electromagnetic bearing and especially to an electromagnetic bearing control apparatus for suppressing to a minimum the vibration-amplitude of vibratory rotational motion of the rotor.

We claim:

1. An electromagnetic bearing control apparatus having means for detecting orthogonal x and y-component signals of radial displacement of a rotor, and servo-circuit means for controlling currents being supplied to electromagnetic coils in accordance with the displacement x and y-component signals from said detecting means such that said rotor is held in a predetermined radial position, said servo-circuit means comprising:
   an x-component control circuit for processing said displacement x-component signal;
   a y-component control circuit for processing said displacement y-component signal;
   selective extraction means for extracting a frequency component to be controlled from said displacement x and y-component signals; and
   means for supplying said displacement x and y-component signals to said selective extraction means, for adding one component of x and y-component signals of said frequency component delivered out of said selective extraction means to the other component of the processed displacement x and y-component signals delivered out of the other of said x and y-component control circuits, and for subtracting the other component of x and y-component signals of said frequency component delivered out of said selective extraction means from one component of said processed displacement x and y-component signals delivered out of one of said x and y-component control circuits;
   wherein said selective extraction means comprises a band-pass filter which coincide with a frequency of a self-excited vibration generated as said rotor rotates.

2. An electromagnetic bearing control apparatus having means for detecting orthogonal x and y-component signals of radial displacement of a rotor, and servo-circuit means for controlling currents being supplied to electromagnetic coils in accordance with the displacement x and y-component signals from said detecting means such that said rotor is held in a predetermined radial position, said servo-circuit means comprising:
   an x-component control circuit for processing said displacement x-component signal;
   a y-component control circuit for processing said displacement y-component signal;
   selective extraction means for extracting a frequency component to be controlled from said displacement x and y-component signals; and
   means for supplying said displacement x and y-component signals to said selective extraction means, for adding one component of x and y-component signals of said frequency component delivered out of said selective extraction means to the other component of the processed displacement x and y-component signals delivered out of the other of said x and y-component control circuits, and for subtracting the other component of x and y-component signals of said frequency component delivered out of said selective extraction means from one component of said processed displacement x and y-component signals delivered out of one of said x and y-component control circuits;
   wherein said selective extraction means comprises a tracking filter which detects a frequency of self-excited vibration generated as said rotor rotates and which is responsive to the detection frequency to extract a self-excited vibration frequency component from said displacement x and y-component signals.

3. An electromagnetic bearing control apparatus having means for detecting orthogonal x and y-component signals of radial displacement of a rotor, and servo-circuit means for controlling currents being supplied to electromagnetic coils in accordance with the displacement x and y-component signals from said detecting means such that said rotor is held in a predetermined radial position, said servo-circuit means comprising:
   an x-component control circuit for processing said displacement x-component signal;
   a y-component control circuit for processing said displacement y-component signal;
   first and second selective extraction means for extracting frequency components to be controlled from said displacement x and y-component signals; and means for supplying said displacement x and y-component signals to said first and second selective means for adding one component of x and y-component signals of one frequency component delivered out of said first selective extraction means to the other component of the processed displacement x and y-component signals delivered out of the other of said x and y-component control circuits for subtracting the other component of x and y-component signals of said one frequency component delivered out of said first selective extraction means from one component of said processed displacement x and y-component signals delivered out of one of said x and y-component control circuits for subtracting said one component of x and y-component signals of the other frequency component delivered out of said second selective extraction means from said the other component of said processed displacement x and y-component signals delivered out of said the other of said x and y-component control circuits, and for adding said the other component of x and y-component signals of the other frequency component delivered out of said second selective extraction means to said one component of said processed displacement x and y-component signals delivered out of said one of said x and y-component control circuits;

wherein each of said first and second selective extraction means comprises a band-pass filter for a frequency of a self-excited vibration generated as said rotor rotates.

4. An electromagnetic bearing control apparatus having means for detecting orthogonal x and y-component signals of radial displacement of a rotor, and servo-circuit means for controlling currents being supplied to electromagnetic coils in accordance with the displacement x and y-component signals from said detecting means such that said rotor is held in a predetermined radial position, said servo-circuit means comprising:

an x-component control circuit for processing said displacement x-component signal;

a y-component control circuit for processing said displacement y-component signal;

first and second selective extraction means for extracting frequency components to be controlled from said displacement x and y-component signals; and means for supplying said displacement x and y-component signals to said first and second selective means for adding one component of x and y-component signals of one frequency component delivered out of said first selective extraction means to the other component of the processed displacement x and y-component signals delivered out of the other of said x and y-component control circuits for subtracting the other component of x and y-component signals of said one frequency component delivered out of said first selective extraction means from one component of said processed displacement x and y-component signals delivered out of one of said x and y-component control circuits for subtracting said one component of x and y-component signals of the other frequency component delivered out of said second selective extraction means from said the other component of said processed displacement x and y-component signals delivered out of said the other of said x and y-component control circuits, and for adding said the other component of x and y-component signals of the other frequency component delivered out of said second selective extraction means to said one component of said processed displacement x and y-component signals delivered out of said one of said x and y-component control circuits;

wherein each of said first and second selective extraction means comprises a tracking filter which detects a frequency of a self-excited vibration generated as said rotor rotates and which is responsive to the detected frequency to the detected frequency to extract a self-excited vibration frequency component from said displacement x and y-component signals.

5. An electromagnetic bearing control apparatus having means for detecting orthogonal x and y-component signals of radial displacement of a rotor, and servo-circuit means for controlling currents being supplied to electromagnetic coils in accordance with the displacement x and y-component signals from said detecting means such that said motor is held in a predetermined radial position, said servo-circuit means comprising:

an x-component control circuit for processing said displacement x-component signal;

a y-component control circuit for processing said displacement y-component signal;

selective extraction means for extracting a frequency component to be controlled from said displacement x and y-component signals; and means for supplying said displacement x and y-component signals to said selective extraction means, adding one component of x and y-component signals of said frequency component delivered out of said selective extraction means to the other component of the processed displacement x and y-component signals delivered out of the other of said x and y-component control circuits, and subtracting the other component of x and y-component signals of said frequency component delivered out of said selective extraction means from one component of said processed displacement x and y-component signals delivered out of one of said x and y-component control circuits when the direction of orbital motion of said rotor coincides with the direction of rotation of said rotor about its own axis, and subtracting said one component of x and y-component signals of said frequency component delivered out of said selective extraction means from said the other component of said processed displacement x and y-component signals delivered out of the other of said x and y-component control circuits, and adding said the other component of x and y-component signals of said frequency component delivered out of said selective extraction means to said one component of said processed displacement x and y-component signals delivered out of one of said x and y-component control circuits when the direction of orbital motion of said rotor does not coincide with the direction of rotation of said rotor about its own axis.

6. An electromagnetic bearing control apparatus according to claim 5 further comprising an oscillator for generating a signal of the same frequency as a natural vibration frequency of a self-excited vibration of said rotor and means for supplying the frequency signal from said oscillator to said selective extraction means.

7. An electromagnetic bearing control apparatus according to claim 6 wherein said oscillator comprises a rotation pulse generator.

* * * * *